United States Patent [19]

Thuruoka et al.

[11] 3,875,564

[45] Apr. 1, 1975

[54] PROGRAMMED DIGITAL SEQUENCE CONTROLLER

[75] Inventors: Hisashi Thuruoka, Ome; Takashi Kogawa, Narashino, both of Japan

[73] Assignee: Hitachi, Ltd., Tokyo, Japan

[22] Filed: Mar. 20, 1973

[21] Appl. No.: 343,035

[30] Foreign Application Priority Data

Mar. 21, 1972 Japan ................................ 47-27382

[52] U.S. Cl. .......................... 340/172.5, 235/151.11

[51] Int. Cl. ........................ G06f 15/46, G05b 15/00

[58] Field of Search ............. 340/172.5; 235/151.11

[56] References Cited

UNITED STATES PATENTS

| | | | |
|---|---|---|---|
| 3,275,988 | 9/1966 | Yetter | 340/172.5 |
| 3,646,521 | 2/1972 | Porter | 340/172.5 |
| 3,651,314 | 3/1972 | Kosen | 235/151.11 |
| 3,745,533 | 7/1973 | Erwin | 340/172.5 |
| 3,753,237 | 8/1973 | Koontz | 340/172.5 |

OTHER PUBLICATIONS

Descriptive Bulletin 1750, "PMC, Programmable Matrix Controller," Allen-Bradley Company, April 1971.

*Primary Examiner*—Gareth D. Shaw
*Assistant Examiner*—James D. Thomas
*Attorney, Agent, or Firm*—Craig & Antonelli

[57] ABSTRACT

A digital control apparatus, for performing the control according to programs selected according to the kind of controlled object, comprising a plurality of read only memories each storing at least one program; wherein required contents are selectively read from the program stored in the first one of the plurality of read only memories, so that an output signal is produced on completion of reading so as to terminate the operation of a program counter attached to the first read only memory; immediately after the termination of the operation of the program counter, the selection and reading of required contents from the program stored in the second read only memory begins; and required contents are thus successively read from the programs stored in the other read only memories in turn in a predetermined order.

9 Claims, 11 Drawing Figures

PROGRAMMED DIGITAL SEQUENCE CONTROLLER

BACKGROUND OF THE INVENTION

1. Field of the Invention

This invention relates to a digital control apparatus for use in control of automobile transportation or the like, and, more particularly, to a digital control apparatus in which various kinds of control programs are stored in plurality of read only memories and, when the apparatus is practically used in control of a desired automobile or the like, only the programs required for the control are selectively read to perform the control.

2. Description of the Prior Art

In a conventional digital control apparatus, the contents of programs or data are stored in read only memories when the contents to be stored need no variation. This is because the use of read only memories is advantageous in respect of the reliability and cost of the apparatus.

However, it often happens that variation is required in the contents to be stored according to the kind or construction of the whole system comprising a digital control apparatus. For example, in the control of processes, railroad, air, sea and automobile transportation, and industrial robots, the contents to be stored are variant according to the kind of the controlled object. Namely, for use in automobiles, the contents to be stored are variant according to the kind of car or the type of engine thereof, and further, for use in industrial robots, according to the layout of the environment of the robots. Therefore, for example for use in an automobile, a plurality of read only memories are respectively required for storing variant kinds of contents predetermined according to the kind of car or the type of engine thereof, or the like, so that a great number of read only memories are required in the control apparatus usually. In addition, even if the model of an automobile is slightly changed, the read only memories utilized in the control apparatus are required to be reformed so as to store the suitable contents for the automobile of changed model.

Meanwhile, the most advantageous read only memory in respect of the cost and reliability is usually composed of a semiconductor integrated circuit by a mask technique. However, the most expensive part of the cost of the integrated circuit is occupied by the expence for making a mask having a suitable pattern according to the contents to be stored. Accordingly, it becomes very expensive to make masks respectively suitable for various kinds of read only memories according to the kind of car or the type of engine thereof, or the like, as discussed above.

SUMMARY OF THE INVENTION

Accordingly, an object of the present invention is to provide a digital control apparatus in which read only memories may be used in common for various kinds of controlled objects, for example automobiles or the like, while the respective designs thereof are somewhat different from one another.

Another object of the present invention is to provide a digital control apparatus comprising read only memories which may be produced at a lower cost than the conventional read only memories.

To perform the above-mentioned objects, the digital control apparatus according to the present invention has a feature in that various kinds of programs determined according to, for example, the kind of car or the type of engine thereof, or the like, are stored in common read only memories and, when the control apparatus is used in control of a desired automobile, the suitable programs corresponding to the kind of the car and the type of engine thereof are selectively read out.

The other objects and features of the present invention will be apparatus from the following detailed description when read in conjunction with the attached drawings.

GENERAL PART OF THE INVENTION

Assume that a processing corresponding to a controlled object is performed by selecting Z programs one after another in a certain order. In this case, it is required to be careful not to perform any other programs provided for other controlled objects.

Figure 1:
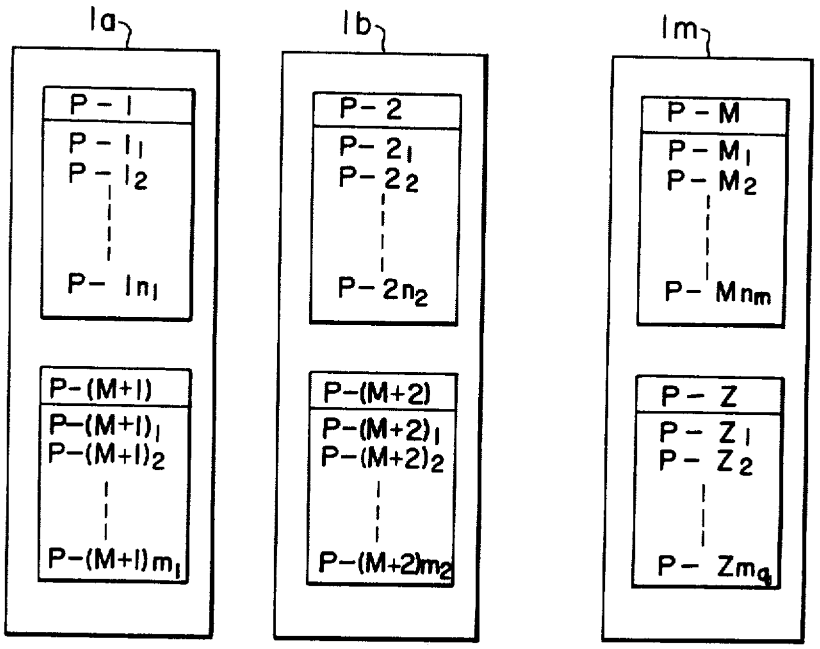
FIG. 1 is a diagram for illustrating the state of the storage of programs in the read only memories.

Above-mentioned Z programs are stored in advance, for example, in m read only memories as shown in FIG. 1. When those Z programs are provided for use in control of automobiles, they include various kinds of programs required for control of various kinds of automobiles.

In this case, a read only memory $1_a$ stores a program P–1 consisting of plural kinds of contents from $P–1_l$ through $P–1_{nl}$ and a program P–(M + 1) consisting of plural kinds of contents from $P–(M + 1)_l$ through $P–(M + 1)_{ml}$, a read only memory $1_b$ stores a program P–2 consisting of plural kinds of contents from $P–2_l$ through $P–2_{n2}$ and a program P–(M + 2) consisting of plural kinds of contents from $P–(M + 2)_1$ through $P–(M + 2)_{m2}$, . . . , and a read only memory $1_m$ stores a program P–M consisting of plural kinds of contents from $P–M_l$ through $P–M_{nm}$ and a program P–Z consisting of plural kinds of contents from $P–Z_l$ through $P–Z_{mq}$.

Using the thus arranged read only memories, required contents are chosen from the programs P–1, P–2, . . . , P–Z by selecting one after another. Such selection is performed according to the order of the programs P—1, P—2, . . . , P—Z, without repeatedly using any one of the programs and also without changing the predetermined order. As aforementioned, unnecessary programs may, of course, be skipped over not to be used.

Figure 2:
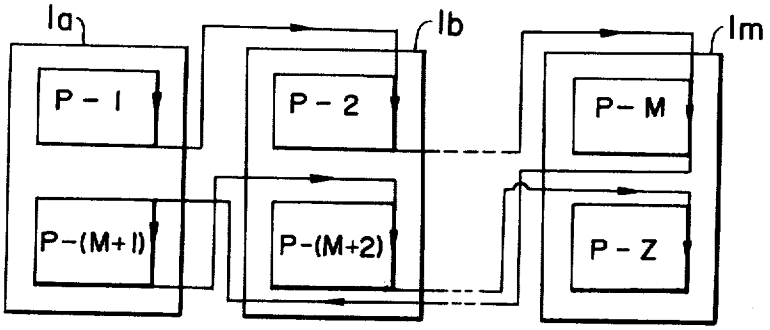
FIG. 2 is a diagram for illustrating the process of reading the stored programs from the respective read only memories.

In the read only memories, the programs are arranged according to the order to be used. For example, in FIG. 1, since the program P—(M + 1) is utilized prior to the program P—(M + 2), the former is stored in the address of smaller number than the latter. FIG. 2 illustrates the order of the selection of the respective programs.

As is obvious from FIG. 1, $n_1$, $n_2$, . . . , and $m_q$ kinds of stored contents are included in the programs P—1, P—2, . . . , and P—Z respectively, and the stored contents of each of the programs are different one another according to the construction or kind of the controlled object. Therefore, only one kind of stored contents which is determined according to the construction or kind of the controlled object is selected from each of the programs. For example, the stored contents $P—1_2$, $P—2_4$, . . . , $P—Z_1$ are selected from the programs P—1, P—2, . . . , P—Z respectively.

According to the present invention, a large number of combination of programs, for example $n_1$ x $n_2$ x . . . x $n_m$ x $m_1$ x $m_2$ x . . . x $m_q$ combinations, are available using m read only memories. If each of read only memories stored a single program, lots of read only memories of the same number as the above-mentioned combination of programs were required.

PREFERRED EMBODIMENTS OF THE INVENTION

Figure 3:
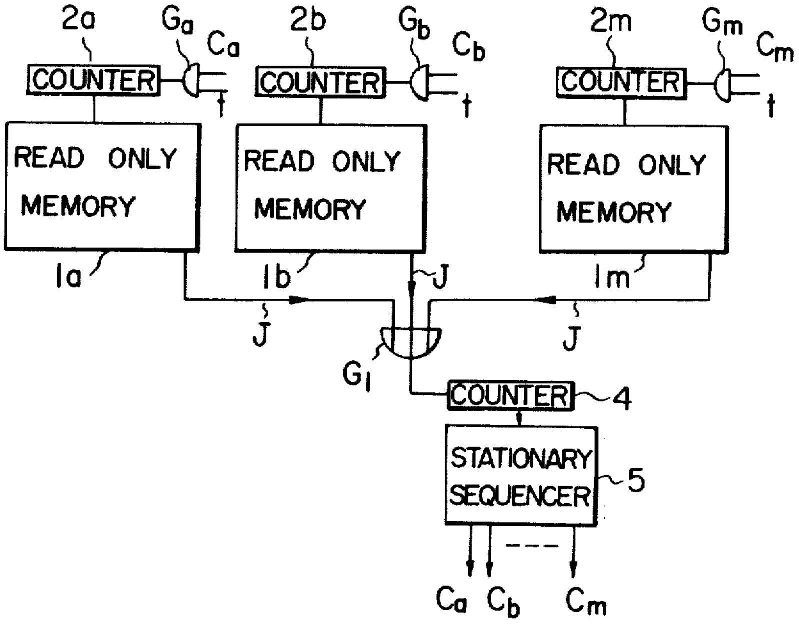
FIG. 3 is a block diagram showing the structure of an embodiment of the present invention.

In FIG. 3 illustrating an embodiment of the present invention, program counters 2*a*, 2*b*, . . . , 2*m* are connected to read only memories 1*a*, 1*b*, . . . , 1*m* respectively. Whenever each of the program counters 2*a*, 2*b*, . . . , 2*m* receives a pulse through the corresponding one of gates G*a*, G*b*, . . . , Gm the contents thereof is added by one.

Each of the read only memories 1*a*, 1*b* . . . , 1m produces a displacement signal J, hereinafter to be referred to as a jump bit, on completion of reading the required contents of a program, for example the program P—1, P—M or the like. Such jump bit J is applied to a program counter 4 through an OR gate $G_1$, so that the address of the contents of the counter 4 is added by one. A stationary sequencer 5 produces control signals C*a*, C*b*, . . . , C*m* in a predetermined manner according to the contents of the program counter 4.

Now, an explanation will be given about the operation of the above-mentioned apparatus embodied in FIG. 3. At first, the gate G*a* is rendered open by being applied with a control signal C*a* produced by the stationary sequencer 5 as well as a clock pulse t so as to set an address corresponding to the program P—1 in the program counter 2*a*. Thus, the program P—1 is read so that the control corresponding to the program P—1 is performed. On completion of execution of the program P—1, a jump bit J is produced by the read only memory 1a to be applied to the program counter 4 through the OR gate $G_1$, so that the contents of the counter 4 is added by one.

Then, a control signal C*b* is produced by the stationary sequencer 5 to be led to the program counter 2*b* through the gate G*b*, so that the address of the program P—2 is set therein and, thus, the program P—2 is read to be performed. On completion of execution of the program P—2, the read only memory 1b produces a jump bit J so that this jump bit J is also led to the program counter 4 through the OR gate $G_1$ and therefore the contents of the counter 4 is added by one. Thus, the respective programs P—1, P—2, . . . , P—Z are selected to be performed in turn. Accordingly, the employment of *m* read only memories enables the control apparatus to perform $n_1$ x $n_2$ x . . . x $m_q$ kinds of control.

The order of the control may be determined by the stationary sequencer 5 which has m bits at most. The stationary sequencer may be composed of diode matrix or the like, and further it may also be composed of logic circuits when the order of the control is required to follow a certain regulation, as mentioned later.

Next, an explanation will be given about another embodiment in which the present invention is applied to a machine hand controller.

Figure 4:
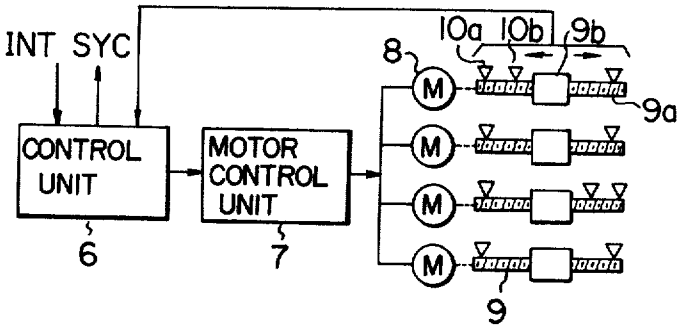
FIG. 4 is a diagram showing the structure of a machine hand system.
Figure 5:
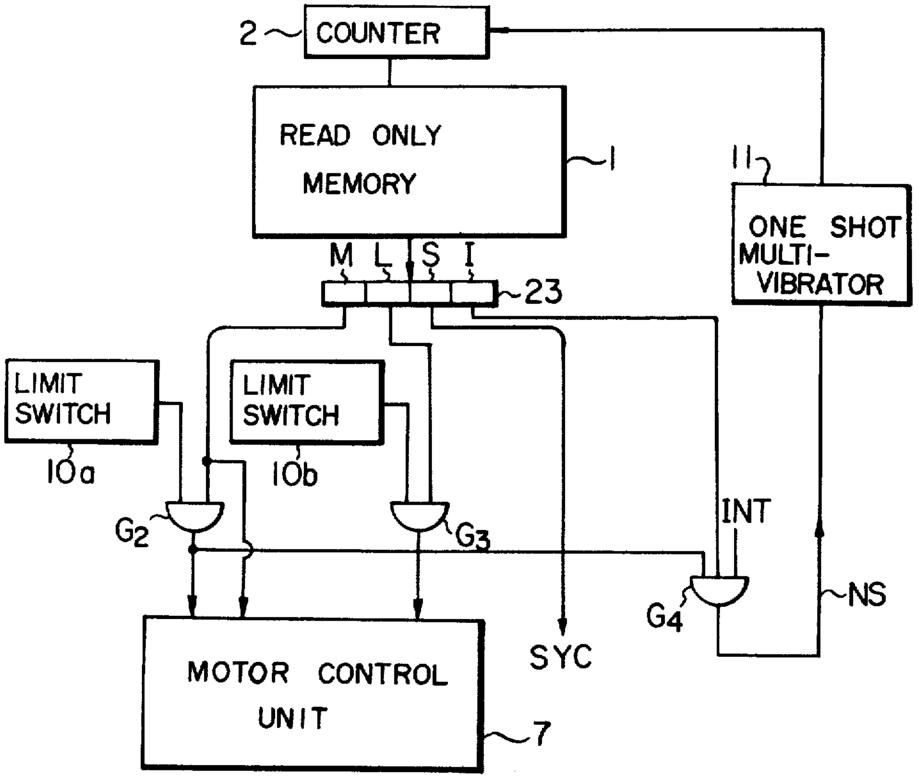
FIG. 5 is a diagram showing the connection of the control portion of the machine hand system of FIG. 4.
Figure 6:
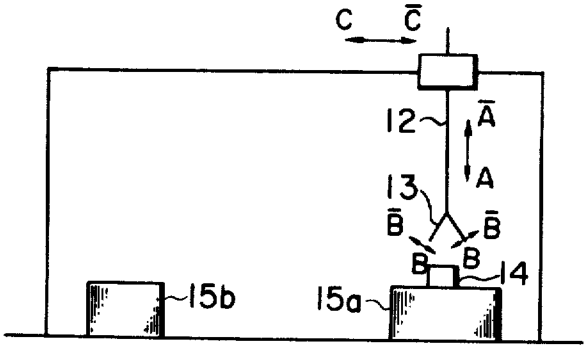
FIG. 6 is a diagram for illustrating a three-axes machine hand system.

FIGS. 4, 5 and 6 show the scheme of a machine or mechanized hand system. In FIG. 4, the output of a control unit 6 is applied to a motor control unit 7 so that a desired motor 8 drives corresponding control axis 9*a* in response to the output of the motor control unit 7 to thereby move a movable member 9*b* mounted on the control axis 9*a* in the direction of the desired allow. Limit switches 10*a* and 10*b* which respectively indicate the stop point and the deceleration point of the machine hand are suitably mounted on the control axis 9*a* and the signals from the respective switches 10*a* and 10*b* are transmitted to the control unit 6. While, the control unit 6 sends out a synchronizing signal SYC undermentioned to a controlled object (not shown) and is also applied with a interlock signal INT undermentioned from the above controlled object.

FIG. 5 shows an example of the construction of the control unit 6 in which the orders or instruction commands read from a read only memory 1 are classified to be separately stored in the output fields M, L, S, and I of an output register 23. For example, the output fields M, L, S, and I respectively store orders read out which give instructions of driving or stopping the control axis 9*a* of FIG. 4, orders read out which give instructions of the deceleration by the limit switch 10*b*, orders read out which give instructions of sending out a synchronizing signal SYC, and orders read out which give instructions of pause.

A signal which has been read to be stored in the field M is applied to the motor control unit 7 so that the controlled axis 9*a* is rotated in the ordered direction to thereby displace the movable member 9*b*, for example in the direction of the left arrow shown in FIG. 4. If it is desired to reduce the speed of the displacement of the movable member 9*b* when it reaches the limit switch 10*b*, the deceleration order has been previously read from the read only memory 1 and stored in the field L of the output register 23. Thus, when the movable member 9*b* reaches the limit switch 10*b*, the limit switch 10*b* produces a signal to be applied to an AND gate G3 along with the signal from the field L of the output register 23, so that the AND gate G3 produces an output signal to be applied to the motor control unit 7. Then, the motor control unit 7 controls a desired motor 8 to be decelerated in response to the output signal of the AND gate G3. The movable member 9*b* continues to displace at the decelerated speed until it reaches the limit switch 10*a*, so that the limit switch 10*a* produces a signal. Thus the output signal of the limit switch 10*a* is applied to the motor control unit 7 through a gate G2 to thereby stop the revolution of the motor 8. The output signal of the gate $G_2$ which orders the motor to stop its revolution is applied to an AND gate $G_4$ along with the signal from the field *I* of the output register 23 which stores a waiting order. Under these circumstances, if a control signal INT which orders the next control operation is applied to the gate $G_4$ from the controlled object, an output signal NS (next signal) of the gate $G_4$ is led to a one-shot multivibrator 11 so that an output signal of the multivibrator 11 is applied to a program counter 2. This results in that the contents of the counter 2 is added by one to thereby read the next order from the read only memory 1. In the same manner, the orders stored in the read only memory 1 are performed one after another. If it is desired to apply a synchronizing signal SYC to the controlled object during an order being performed or after an order has been performed, a synchronizing order is read to be led into the field S of the output register 23.

Now, a particular example, wherein a machine hand is controlled by the thus arranged control apparatus, will be explained in detail.

FIG. 6 shows a three-axes machine hand, in which an arm 12 is controlled by three control axes. In the drawings, the reference characters A and $\bar{A}$ designate control operations to move the arm 12 downward and upward respectively, B and $\bar{B}$ to grasp parts 14 by a grasping mechanism 13 provided at the end of the arm 12 and to release the same respectively, and C and $\bar{C}$ to move the arm 12 to the left and to the right respectively.

These control operations A, $\bar{A}$ and the like correspond to the programs P–1, P–2 and the like shown in FIG. 1 respectively. Further, these control operation A, A and the like are performed by the respective orders which have been read to be stored in the field M of the register 23 shown in FIG. 5.

Figure 7:
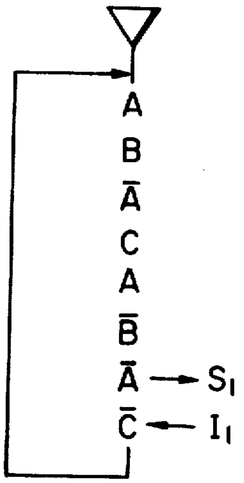
FIG. 7 is a diagram for illustrating the operation sequence of the machine hand of FIG. 6.

FIG. 7 shows the operation sequence of the arm 12 and the grasping mechanism 13 of FIG. 6.

Referring to FIGS. 6 and 7, the arm 12 controlled so that it moves downward from the state shown in FIG. 6 — (operation A), grasps the parts 14 on a stand 15*a* — (operation B), comes up — (operation $\bar{A}$), moves to the left — (operation C), moves downward again — (operation A), puts the parts 14 on a stand 15*b* — (operation $\bar{B}$), comes up again (operation $\bar{A}$) to indicate the completion of the transport of the parts — (state $S_1$), and moves to the right (operation $\bar{C}$) to indicate the state waiting next parts — (state $I_1$). The above sequence may be repeated according to orders. Further, the reference characters $\bar{A} \longrightarrow S_1$ designate the order to send a synchronizing signal SYC to the controlled object on completion of performing the control operation $\bar{A}$, and $\bar{C} \longleftarrow I_1$ the order to begin the next control upon receiving a control signal INT when the control operation has been completed.

In the machine hand control, such a reciprocating motion of a three-axes machine hand as above-mentioned in a fundamental operation and a complicate operation by a machine hand having more than three axes is considered to be composed by adding some other operations to the above fundamental operation by a three-axes machine hand.

Figure 8:
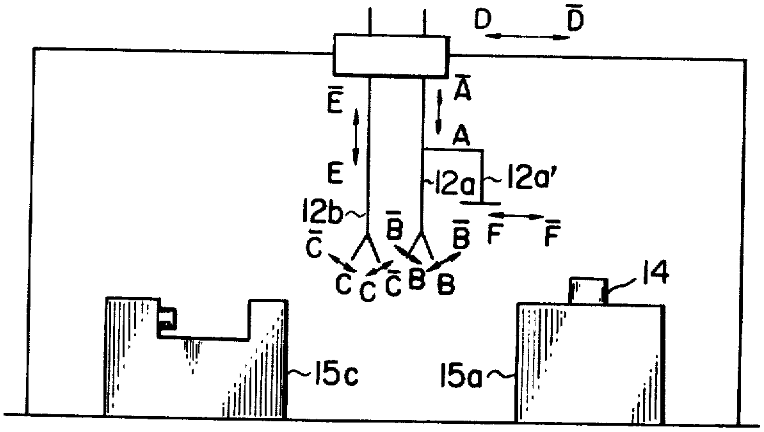
FIG. 8 is a diagram for illustrating a six-axes machine hand system.
Figure 9:
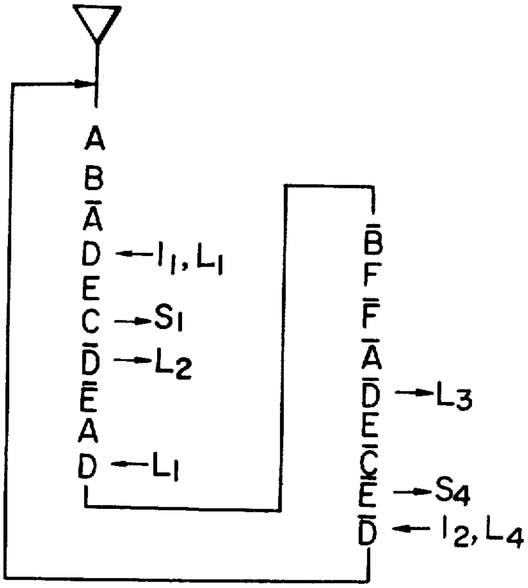
FIG. 9 is a diagram for illustrating the operation sequence of the machine hand system of FIG. 8.

Referring to FIGS. 8 to 11, an explanation will be made about a six-axes machine hand system. In FIG. 8, assume that parts 14 on a stand 15*a* are transported to attach to a machine tool 15*c* in the left side by a right arm 12*a*, pressed left by an auxiliary arm 12*a'*, and detached from the machine tool 15*c* by the left arm 12*b* on completion of processing. The above control operation may be illustrated by such a sequence as shown in FIG. 9. Further, divided in two groups of operations, the sequence of the above-mentioned control operation may be illustrated as FIG. 11. Although the respective operations corresponding to the deceleration order L, the waiting order I, and the synchronizing order S are not shown in FIG. 11, such control operation may be added optionally according to the construction or layout of the controlled object. The orders L, I, and S are adapted to be stored in the above-mentioned fields L, I, and S of the output register 23 respectively.

Figure 10:
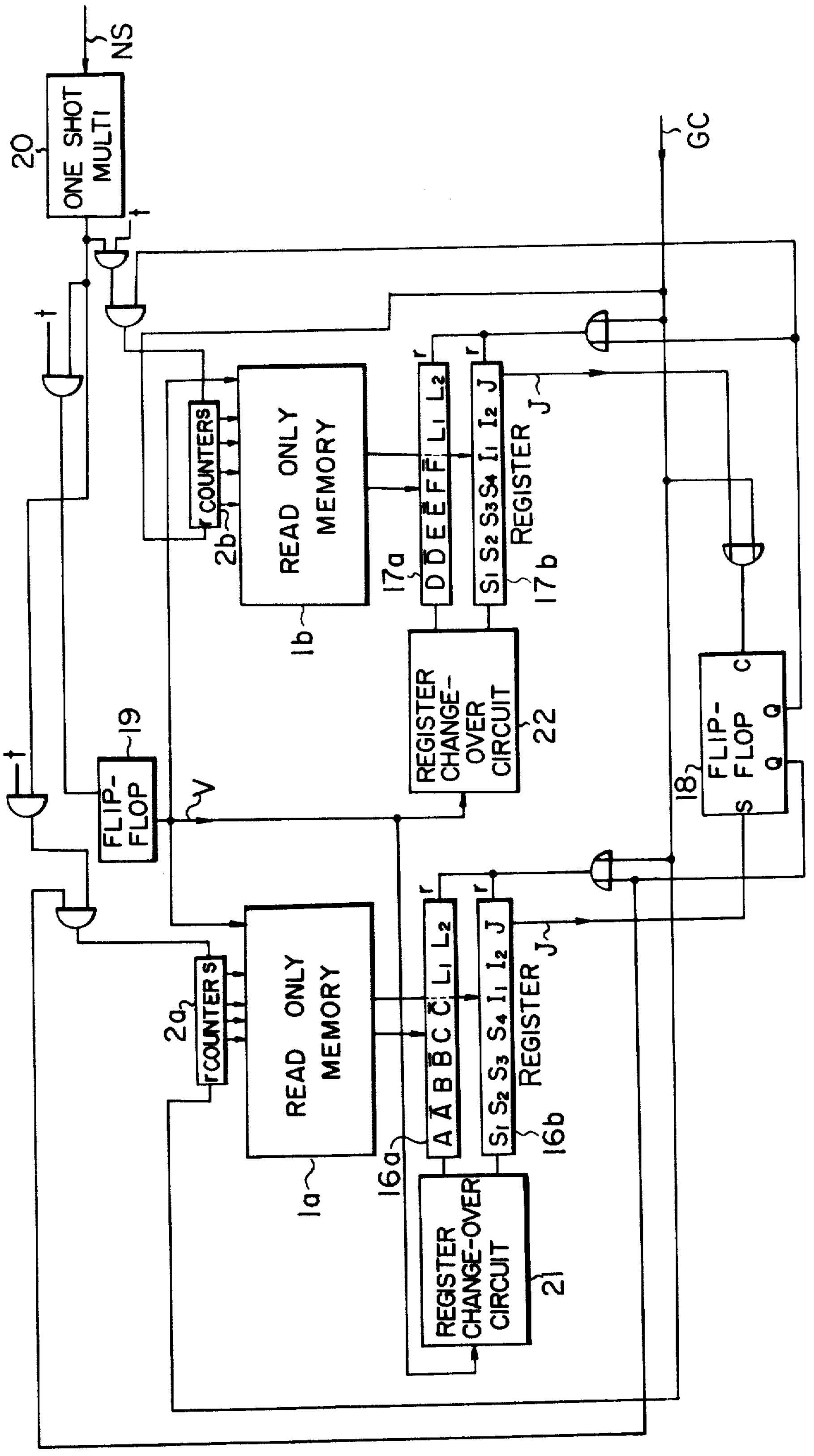
FIG. 10 is a diagram showing the circuitry of the control portion of the machine hand system of FIG. 8.

If the programs corresponding to the control operations A, $\bar{A}$, $\bar{B}$, $\bar{B}$, $\bar{C}$, and $\bar{C}$ and the programs corresponding to the waiting order I, deceleration order L, and synchronizing order S are stored in one read only memory, and the programs corresponding to the control operations D, $\bar{D}$, E, $\bar{E}$, F, and $\bar{F}$ and the programs corresponding to the waiting order I, deceleration order L, and synchronizing order S are stored in another read only memory, such the sequence as shown in FIG. 9 may be controlled by using two read only memories. In FIG. 10, a read only memory 1a shows the above-mentioned one read only memory and 1b the above-mentioned another read only memory. In such the read only memories 1a and 1b, one word is composed of eight bits and two words constitute one sequence of program. The respective first words of the programs stored in the read only memory 1a include the orders corresponding to the control operations A, $\bar{A}$, B, $\bar{B}$, C, and $\bar{C}$ and the deceleration orders $L_1$ and $L_2$ and the respective second words of the same include the synchronizing orders $S_1$, $S_2$, $S_3$ and $S_4$, waiting orders I, and $I_2$ and jump bit order J. These first and second words are read out to be stored in the registers 16a and 16b respectively. In the same manner, the respective first words of the programs stored in the read only memory 1b include the orders corresponding to the control operations D, $\bar{D}$, E, $\bar{E}$, F, and $\bar{F}$ and the deceleration orders $L_1$ and $L_2$ and the respective second words of the same include the synchronizing orders $S_1$, $S_2$, $S_3$, and $S_4$, waiting orders $I_1$ and $I_2$, and jump bit order J. In this case, the first and second words are read to be stored in the registers 17*a* and 17*b* respectively.

In the drawings, first, a reset signal GC resets program counters 2*a* and 2*b* as well as output registers 16*a*, 16*b*, 17*a* and 17*b*.

When a one shot multivibrator 20 is actuated to produce a pulse in response to a step-going signal NS, the contents of the program counter 2*a* is added by one, while the contents of the program counter 2*b* is not added because of the "0" level of the output Q of an operation mode flip-flop 18. At the same time, the output of the one shot multivibrator 20 is applied to a word change-over flip-flop 19 which is adapted to be inverted twice per one input pulse so as to produce two output pulses V. The output pulses V are applied to the read only memories 1a and 1b as well as output register change-over circuits 21 and 22. In response to the first one of the above-mentioned two output pulses V, the first word of program is read from the read only memory 1*a* or 1*b* to be stored in the output registers 16*a* or 17*a*, respectively, and, in response to the second pulse of the same, the second word of program is read from the read only memory $1a$ or $1b$ to be stored in the output register 16*b* or 17*b*, respectively.

Figure 11:
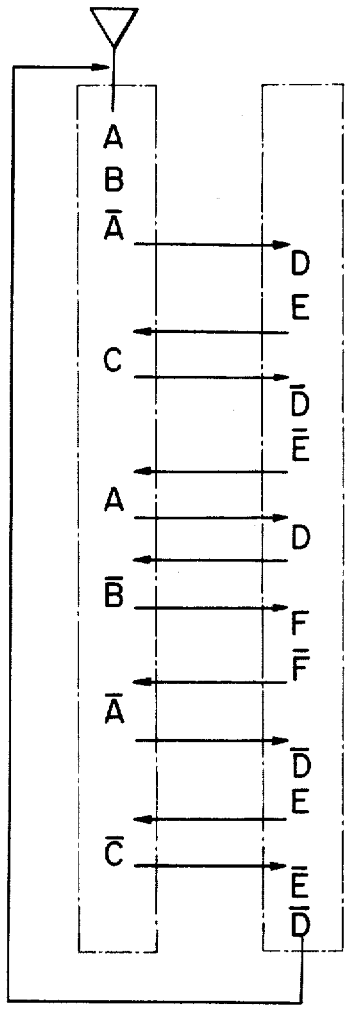
FIG. 11 is a diagram showing the state of control by utilizing two read only memories in the control shown in FIG. 9.

When, therefore, such an operation control as shown in FIG. 9 is aimed to be performed, the order corresponding to the control operation A is stored first of all in the register 16*a* in response to the first pulse of the above-mentioned output signal V. Nothing is read in response to the second pulse of the output signal V because no order to be stored in the register 16*b* has been included in the first step. The control operation for the mortor will be then effected according to the contents of the register 16*a* in the same manner as explained in conjunction with FIG. 5, and therefore the detailed explanation of which is omitted here. Thus, whenever one clock pulse is given, the program counter 2*a* is added by one, the flip-flop 19 produces two pulses, and the orders corresponding to the respective control operations B and $\bar{A}$ are read out so as to perform such control operations in turn. On completion of the operation $\bar{A}$, the output register 16*b* produces a jump bit J to set the operation flip-flop 18. This results in that the program counter 2*a* is held in the address by which the order corresponding to the control operation $\bar{A}$ has been read out, so that the program counter 2*b* is enabled. Thus, the control operation jumps into the sequence of the control operations D and E as shown in FIG. 11.

On completion of the control operation E, a jump bit J is sent out again to thereby reset the operation flip-flop 18, resulting in that the programs stored in the read only memory 2*a* are read out to be performed. Namely, the execution of the control operation C begines.

As described above, the control is effected successively by utilizing the read only memories 2*a* and 2*b* alternatively whenever a jump bit J is sent out.

Thus, a machine hand controller including from three to six control axes may be constructed by utilizing mere two read only memories, as shown in FIG. 10.

Assuming that a read only memory is provided for storing each control sequence required for each control axis without arranging programs to combine into some groups, quite a lot of read only memories will be required in this case.

As explained above in detail, so many control sequences can be performed by combining the contents of each program stored in a few read only memories, so that a digital control apparatus according to the present invention shows an excellent effect.

We claim:

1. Programmed digital sequence controller comprising:

a plurality of read only memories, each of said memories storing a plurality of programs, each of the programs including a plurality of different instruction commands which are selectively utilized to control an object;

a plurality of first program counters, each of said first program counters being connected to a respective read only memory for indicating the address of at least one instruction command of a predetermined program stored within said read only memory so as to read out the at least one instruction command indicated;

a plurality of input means, each of said input means being connected to a respective first program counter for setting the address of the at least one instruction command of the predetermined program to be selected into said program counter;

output means connected to said read only memories for producing at least one output signal in response to the completion of reading out of at least a predetermined instruction command indicated by said first program counter; and a stationary sequencer responsive to the output signal from said output means for producing signals for application to said input means and for selecting said read only memory to be addressed one after another.

2. Programmed digital sequence controller according to claim 1, wherein said output means includes a second program counter connected to all of the read only memories for producing an output signal upon completion of the reading out of the indicated instruction command from a respective read only memory.

3. Programmed digital sequence controller according to claim 1, further comprising a plurality of output registers, each of said output registers being connected to a respective read only memory for storing the at least one instruction command read out from the associated read only memory, and means for controlling the object in accordance with the contents of said output registers.

4. Programmed digital sequence controller according to claim 3, wherein said output registers are connected to said output means for providing a signal thereto upon completion of reading out of a predetermined instruction command from the associated read only memory.

5. Programmed digital sequence controller according to claim 3, wherein each said output registers includes a plurality of fields, each of said fields receiving at least a predetermined one of the instruction commands read out from the associated read only memory.

6. Programmed digital sequence controller according to claim 1, further comprising a plurality of first and second output registers, each of said first and second output registers being connected to a respective read only memory for storing predetermined instruction commands read out from the associated read only memory, and means for controlling the object in accordance with the contents of said first and second output registers.

7. Programmed digital sequence controller according to claim 6, wherein each of said first and second output registers includes a plurality of fields, each of said fields arranged for storing at least one predetermined instruction command read out from the associated read only memory.

8. Programmed digital sequence controller according to claim 7, further comprising switching means connected to respective first and second output registers, said switching means being responsive to said input means for selectively actuating said first and second output registers for storing the at least one instruction command read out from the associated read only memory.

9. Programmed digital sequence controller according to claim 8, wherein two read only memories are provided and said stationary sequencer includes a flip-flop responsive to an output signal to one of said first and second registers associated with a respective read only memory.

* * * * *